United States Patent
Kim et al.

(10) Patent No.: US 11,646,123 B2
(45) Date of Patent: May 9, 2023

(54) THREE-WAY VALVE OPERATIONAL TO BOTH TRANSFER STEAM TO A DECONTAMINATION WATER TANK UNDER ONE ACCIDENT SITUATION AND DISCHARGE THE STEAM TO ATMOSPHERE UNDER A DIFFERENT ACCIDENT SITUATION

(71) Applicant: Korea Atomic Energy Research Institute, Daejeon (KR)

(72) Inventors: Sung Il Kim, Daejeon (KR); Kwang Soon Ha, Daejeon (KR); Jin-Ho Song, Asan-si (KR); Yong Mann Song, Daejeon (KR); Byeonghee Lee, Seongnam-si (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 381 days.

(21) Appl. No.: 16/221,797

(22) Filed: Dec. 17, 2018

(65) Prior Publication Data
US 2019/0189299 A1    Jun. 20, 2019

(30) Foreign Application Priority Data
Dec. 19, 2017   (KR) .................. 10-2017-0175022

(51) Int. Cl.
*G21C 9/00*      (2006.01)
*G21D 3/06*      (2006.01)
(Continued)

(52) U.S. Cl.
CPC ............. *G21C 9/00* (2013.01); *G21D 1/02* (2013.01); *G21D 3/06* (2013.01); *G21F 9/001* (2013.01);
(Continued)

(58) Field of Classification Search
CPC .......... G21C 9/00; G21C 9/012; G21C 19/30; G21D 3/06; G21D 1/02; G21F 9/001
(Continued)

(56) References Cited

U.S. PATENT DOCUMENTS 5,011,652 A * 4/1991 Tominaga ............... G21C 15/18
                                                                  376/283
2013/0182812 A1   7/2013 Eckardt et al.
(Continued)

FOREIGN PATENT DOCUMENTS

EP    3336853 A1    6/2018
JP    2012255660 A  12/2012
(Continued)

*Primary Examiner* — Jack W Keith
*Assistant Examiner* — Daniel Wasil
(74) *Attorney, Agent, or Firm* — Fredrikson & Byron, P.A.

(57) ABSTRACT

Disclosed herein is a nuclear power plant main steam system that reduces the atmospheric discharge of radioactive materials generated in an accident. The system includes: a decontamination water tank containing decontamination water; and a connection pipe for connecting the decontamination water tank to a main steam pipe which connects a steam generator and a turbine. A main steam safety valve or a connection valve is provided as a three-way valve configured to discharge the generated steam to the atmosphere when an accident occurs within a design basis and to transfer the generated steam to the decontamination water tank when an accident involving damage to nuclear fuel occurs. The main steam system reduces discharge of radioactive materials to the atmosphere when a containment bypass accident (e.g., a steam generator tube rupture caused by high-temperature steam) occurs.

17 Claims, 9 Drawing Sheets

(51) Int. Cl.
*G21D 1/02* (2006.01)
*G21F 9/00* (2006.01)
G21C 17/00 (2006.01)
G21C 9/012 (2006.01)
G21C 19/30 (2006.01)

(52) U.S. Cl.
CPC ........... *G21C 9/012* (2013.01); *G21C 17/002* (2013.01); *G21C 19/30* (2013.01)

(58) Field of Classification Search
USPC ........................................ 376/282, 283, 309
See application file for complete search history.

(56) References Cited

U.S. PATENT DOCUMENTS

2014/0010340 A1* 1/2014 Nilsson ..................... G21F 9/02
 376/314
2017/0312679 A1 11/2017 Hill

FOREIGN PATENT DOCUMENTS

| | | |
|---|---|---|
| KR | 1020130137617 A | 12/2013 |
| KR | 101656314 B1 | 9/2016 |
| KR | 1020170104473 A | 9/2017 |

\* cited by examiner

[Fig.1]
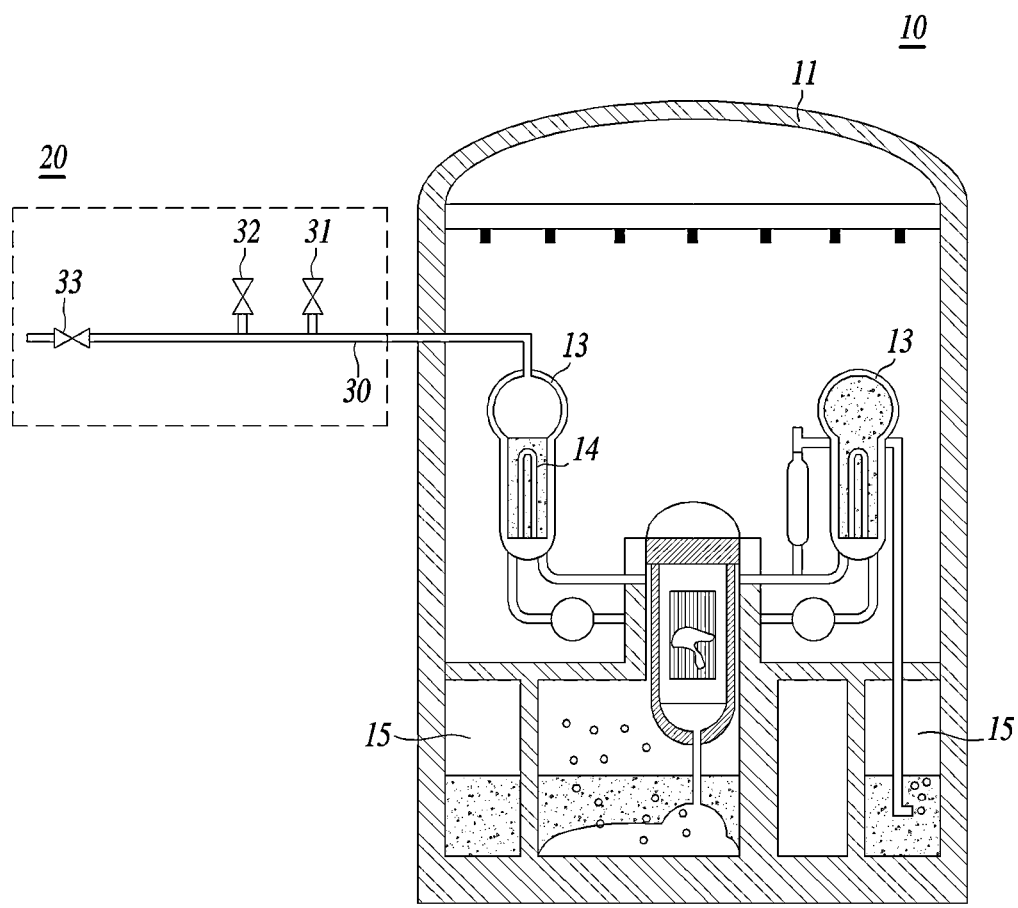
Prior Art

[Fig.2]
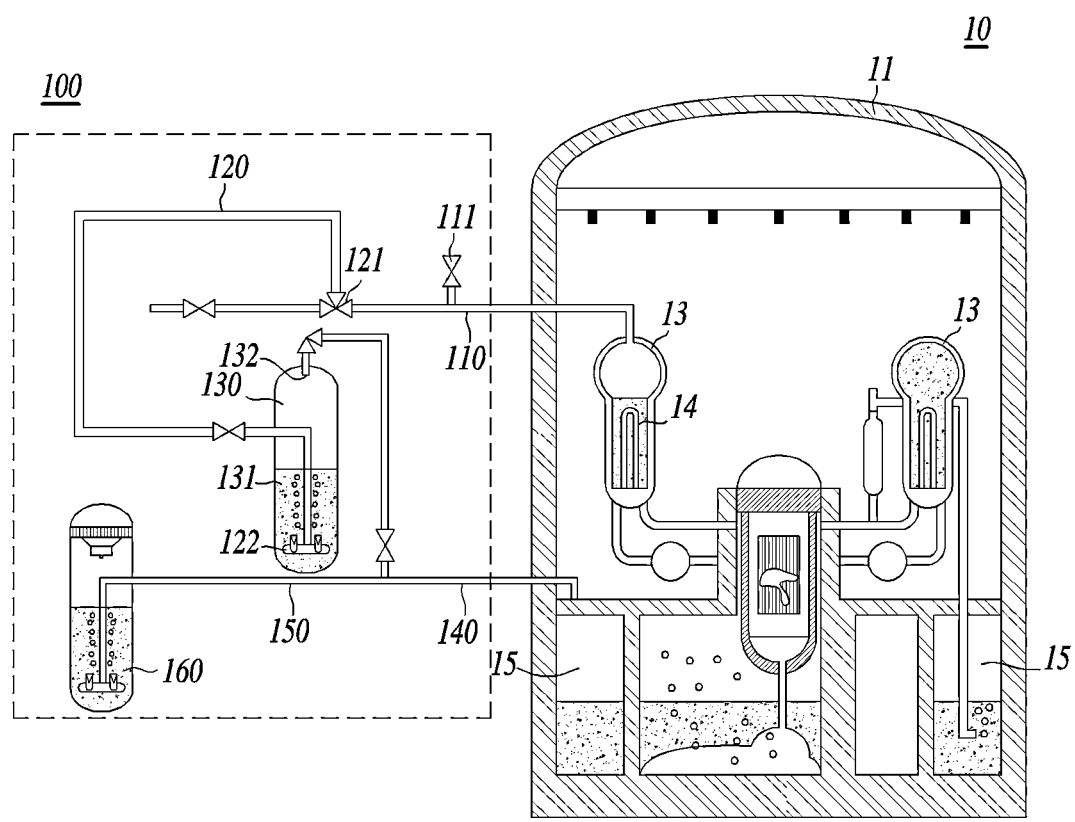

[Fig.3]
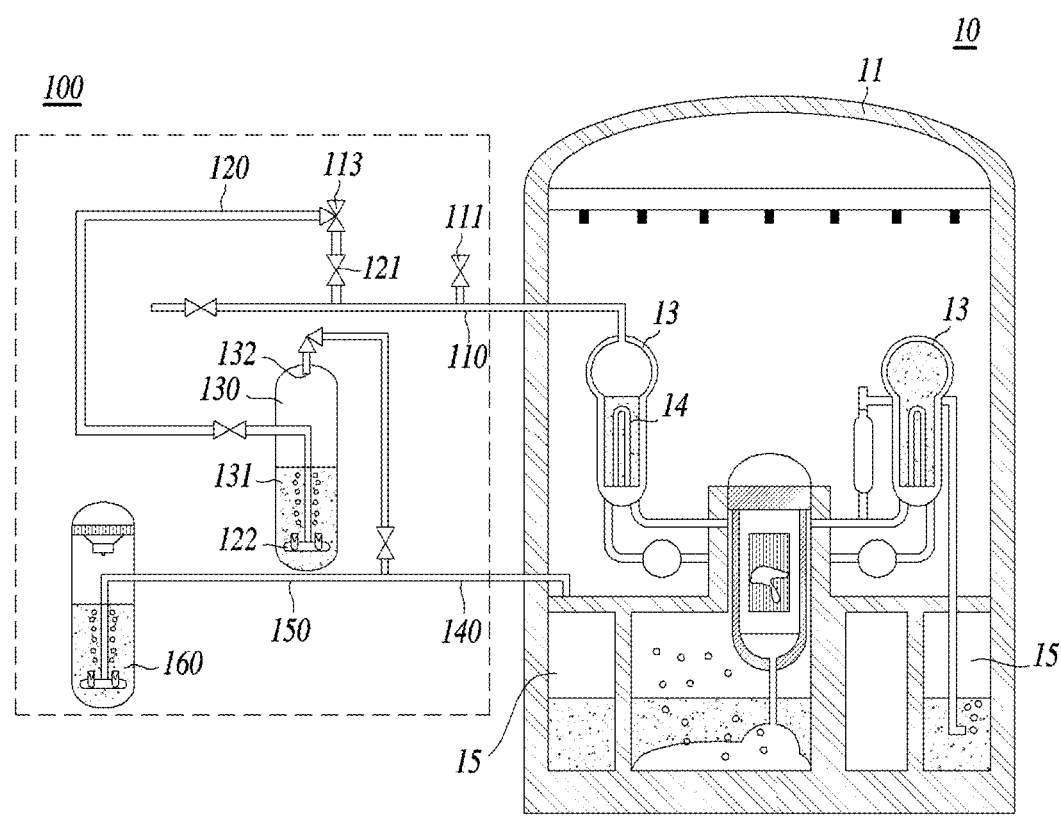

[Fig.4]
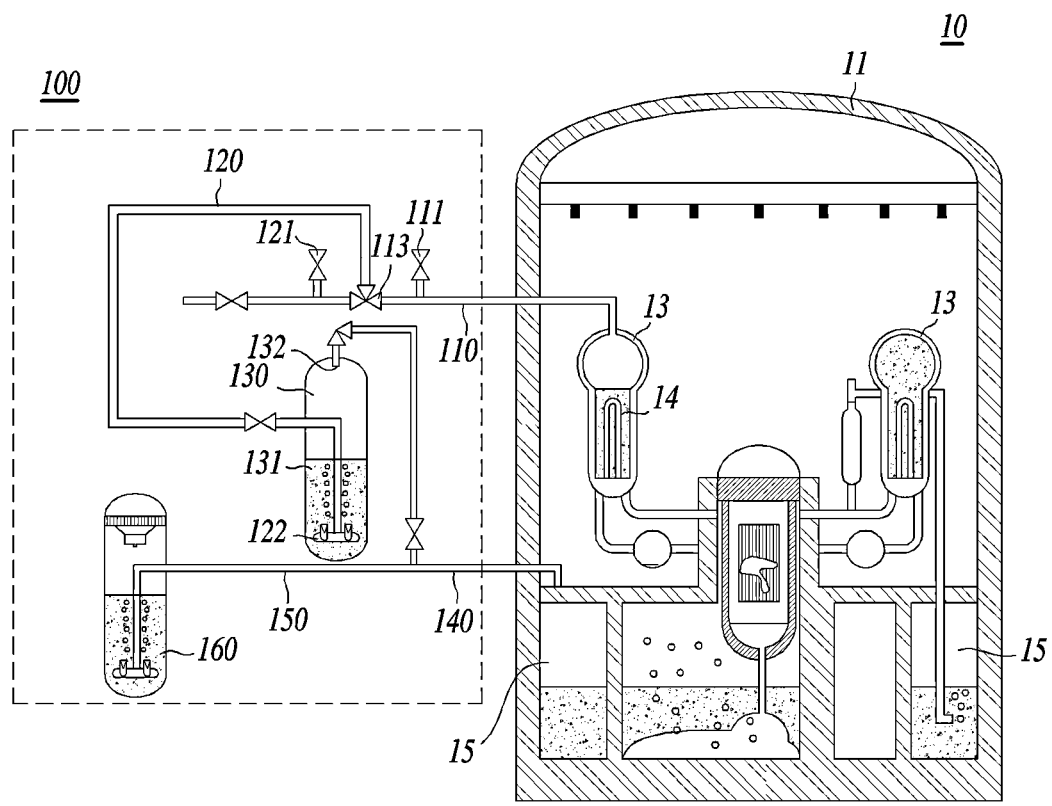

[Fig.5]
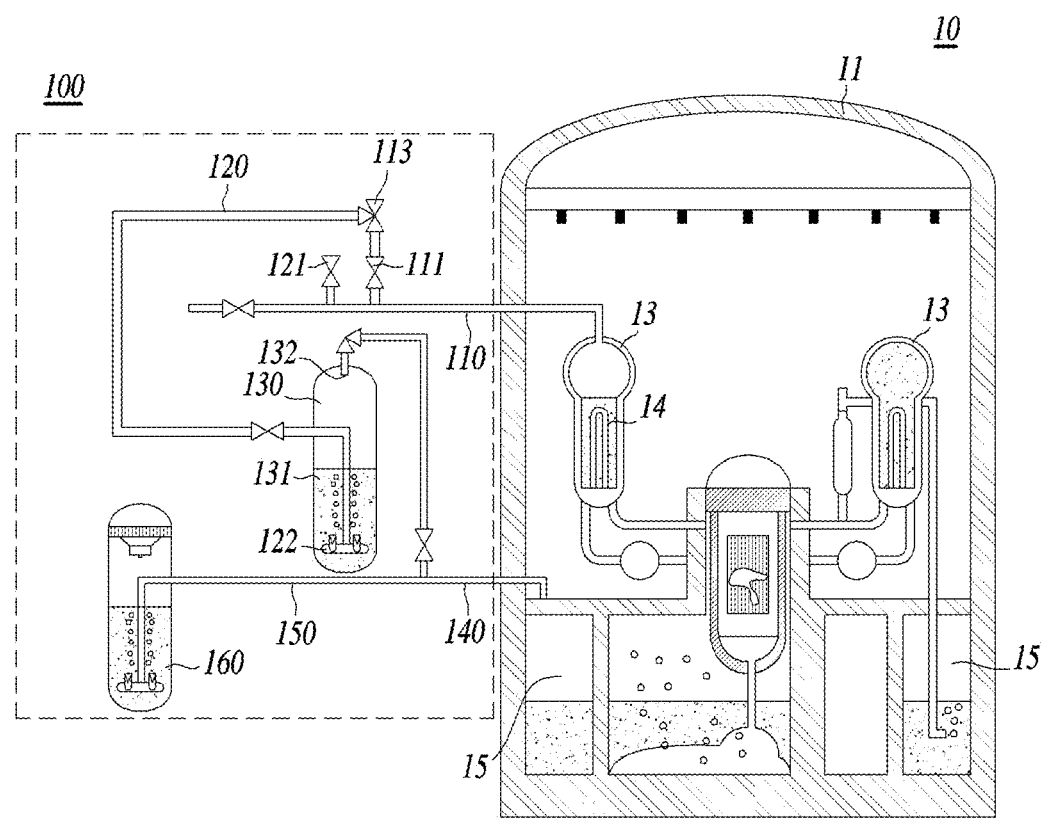

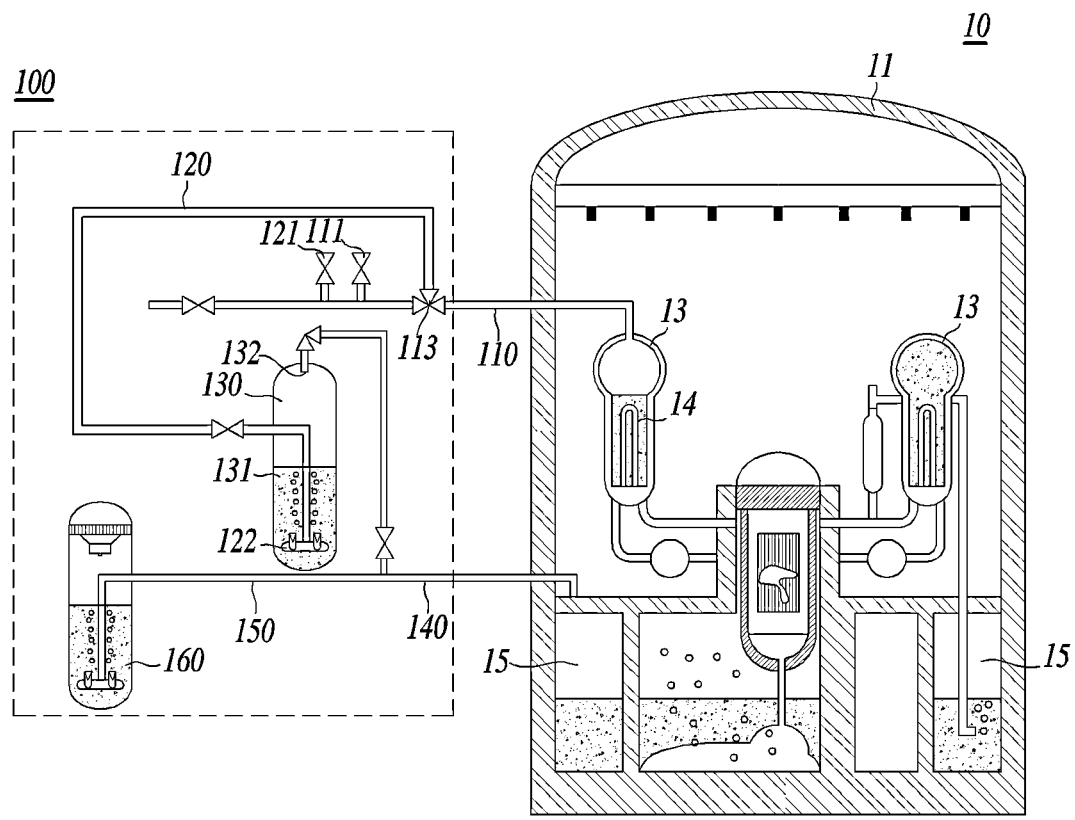
[Fig.6]

[Fig. 7]
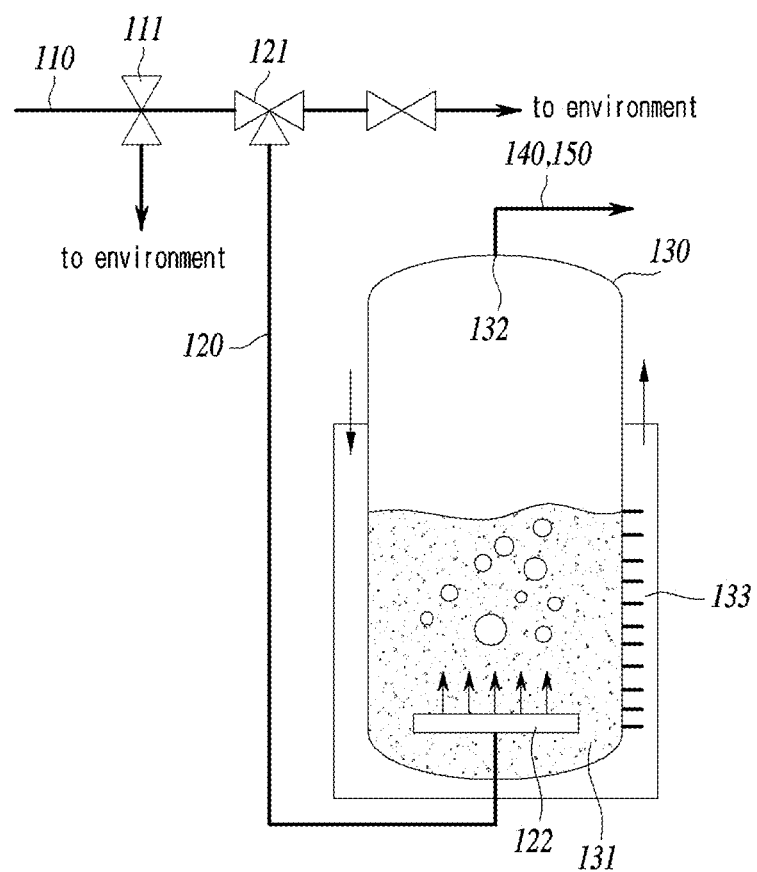

[Fig.8]
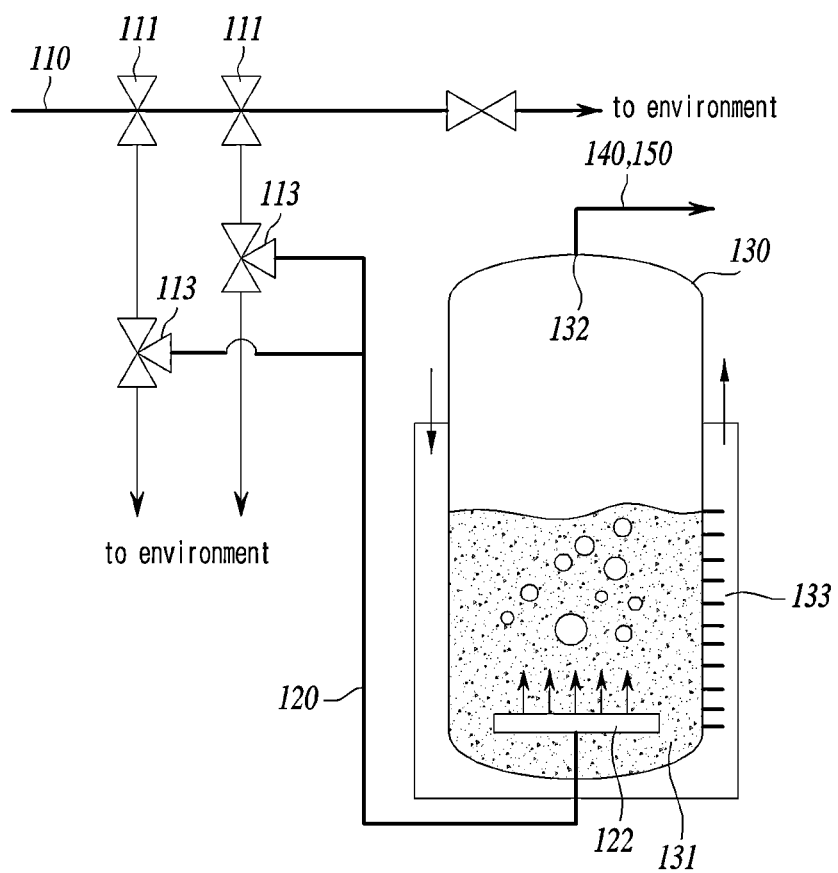

[Fig.9]
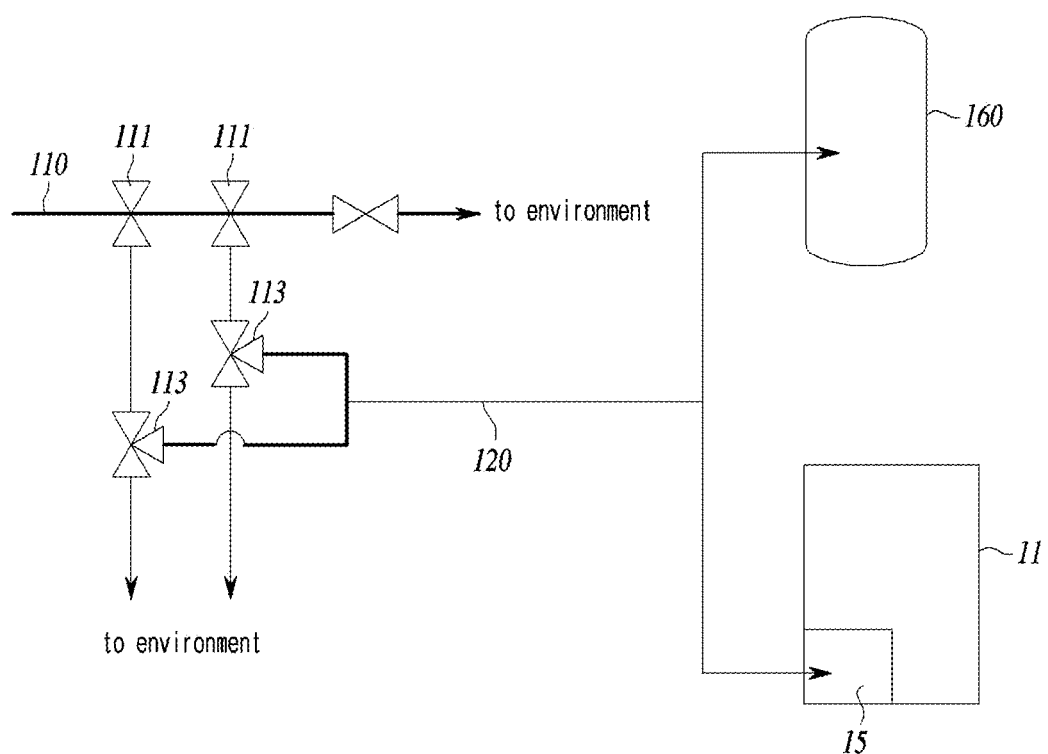

THREE-WAY VALVE OPERATIONAL TO BOTH TRANSFER STEAM TO A DECONTAMINATION WATER TANK UNDER ONE ACCIDENT SITUATION AND DISCHARGE THE STEAM TO ATMOSPHERE UNDER A DIFFERENT ACCIDENT SITUATION

CROSS-REFERENCES TO RELATED APPLICATION

This patent application claims the benefit of priority under 35 U.S.C. § 119 from Korean Patent Application No. 10-2017-0175022 filed Dec. 17, 2017, the contents of which are incorporated herein by reference.

BACKGROUND OF THE INVENTION

1. Field of the Invention

The present disclosure relates to a main steam system for reducing the release of radioactive materials to atmosphere under a severe accident.

2. Description of the Related Art

Since Fukushima nuclear disaster, countries over the world have reinforced regulation so as to secure capability for dealing with severe accident regarding not only improved-type light water reactors but also nuclear power plants in operation. Korea also enacted regulation on severe accidents in June, 2016 (specified that severe accidents were subjected to legal accident management). The severe accident legislation demands that accumulated frequency of accidents with no less than 100 TBq of discharged amount of Cs-137 be less than $10^{-6}$/Rx-year. Thus, it is essential that release of radioactive materials during severe accidents is minimized not only for complying with the regulations but also for protecting health of general public and minimizing environmental contamination.

The most important measure for preventing release of radioactive materials during severe accidents is an effort to ensure the integrity of a containment building. To this end, after Fukushima nuclear disaster, installation of a mobile diesel power generator, a waterproof water gate, filtering discharge equipment, etc. have ever been performed for nuclear power plants in operation or newly constructed nuclear power plants, and through these measures, the safety of nuclear power plants was remarkably improved. However, when a steam generator tube rupture (SGTR) or an intersystem loss of coolant accident (ISLOCA) is caused by a secure accident, even though the integrity of the containment building is ensured, radioactive materials bypass the containment building and are directly discharged to the air, and thus, this still remains as an important issue in an aspect of nuclear reactor safety.

While efforts for preventing such accidents are important, it is important in an aspect of nuclear reactor safety to establish a measure for appropriately responding to the accident when a bypass accident occurs.

U.S. Nuclear Regulatory Commission (USNRC) has been interested in the containment bypass accidents, and in particular, in the steam generator tube rupture caused by a severe accident and has continuously carried out research. According to the research results, it became known that a temperature induced SGTR (TI-SGTR) may be caused by high-temperature and high-pressure steam and the like, and in this regard, under conditions of a severe accident in a nuclear power plant in operation, research on a thermal hydraulic analysis about the possibility of steam generator tube rupture, a structure integrity evaluation, etc. have been carried out.

Reflecting the above facts, in the state-of-the-art reactor consequence analysis (SOARCA) project (NUREG-1935, 2012/11) recently carried out in U.S., a value of 1.0E-07/ry smaller by $\frac{1}{10}$ than that of the general accident was used in a bypass accident as the core damage frequency (CDF) for selecting a scenario of severe accident (for each group in which similar causes are summed). In particular, in the SOARCA project, alpha mode containment failure, direct containment heating (DCH), etc. which have remarkably low occurrence possibility were excluded, whereas the TI-SGTR and the ISLOCA were selected as subject accidents. Also in South Korea, a detailed model development and an optimal analysis for the same bypass accident are anticipated through a level 2 PSA of the SOARCA project recently started by Korea Hydro & Nuclear Power Co. Ltd.

When a containment bypass accident occurs, such as SGTR, ISLOCA, etc., caused by a severe accident, radioactive materials are directly released to the air in surrounding environment. Therefore, it is essential to drastically reduce the materials and minimize threat to human health and environmental pollution for public acceptability of nuclear power generation. At present, equipment for dealing with such accidents and reducing radioactive materials does not exist. Accordingly, development of innovative equipment as well as an appropriate accident management strategy for dealing with the containment bypass accidents can be said essential.

Thus, while studying on equipment for reducing the release of radioactive materials to the environment when a severe accident occurred in a nuclear power plant, the inventors of the present invention developed a main steam supply system which could prevent radioactive materials from directly infiltrating into the main steam system and being directly released to the air, and found that when a containment bypass accident occurs including an SGTR due to high-temperature steam in a severe accident, the release of radioactive materials could be reduced, and thus, completed the present invention.

SUMMARY OF THE INVENTION

When a steam generator tube rupture (SGTR), an intersystem loss of coolant accident (ISLOCA), or the like occurs, a nuclear reactor is stopped in response to a signal of pressurizer low water level etc. Subsequently, a main steam isolation valve (MSIV) is operated automatically in response to a signal of LOCA and secondary side high radioactivity, or operated manually by an operator, and thus, a damaged steam generator is isolated from a turbine power generator.

Subsequently, a primary system is cooled by using a sound steam generator (water supplier and condenser) or an atmospheric dump valve (ADV, note that this is not a driven passively). Here, although succeeding in isolation, the pressure of the damaged steam generator is discharged to the air through a main steam safety valve (MSSV) located upstream from the main steam isolation valve (MSIV).

To prevent such direct release of the radioactive materials, a change in an emergency operation guide has been made such that the pressure is safely discharged to the condenser instead of external environment by using a bypass valve formed in the MSIV. However, since the bypass valve has no safety grade and has no guarantee in the performance thereof in severe accident condition (for example, a high-temperature and high-pressure atmosphere in case of a steam generator tube rupture (SGTR) of a steam generator tube 14 caused by the severe accident), it is difficult to perform such a procedure in the severe accident management guide (SAMG), and it is unavoidable to discharge radioactive materials to an external environment when the main steam safety valve (MSSV) is stuck open.

From the above description, when considering various accident sequences, the most unfavorable case may be the case in which radioactive materials are discharged through a stuck-open main steam safety valve (MSSV) of a steam generator. In particular, when the steam generator is exhausted, since radioactive materials are directly discharge to the air almost without decontamination, the discharge of radioactive materials in this case is most serious. Thus, decontamination performance for radioactive materials from an exhausted steam generator is very important.

Embodiments of the present invention are directed to suppress the discharge of radioactive materials in the case of a main steam safety valve (MSSV) stuck-open accident.

Embodiments of the present invention are also directed to provide an apparatus which exhibits a superior decontamination performance such that when a great amount of steam including radioactive materials is discharged, degradation of the decontamination performance due to a temperature rise and boiling in decontamination water tank is prevented. According to an aspect of the present invention, there is provided a nuclear power plant main steam system, which reduces the atmospheric discharge of radioactive materials generated in an accident, the system including: a decontamination water tank containing decontamination water; and a connection pipe for connecting the decontamination water tank through a main steam safety valve from a main steam pipe which connects a steam generator and a turbine, wherein the main steam safety valve is configured by a three-way valve, and is configured to discharge the generated steam to the air when an accident occurs within a design basis and to transfer the generated steam to the decontamination water tank when a severe accident occurs.

According to another aspect of the present invention, there is provided a nuclear power plant main steam system, which reduces the atmospheric discharge of radioactive materials generated in an accident, the system including: a decontamination water tank containing decontamination water; and a connection pipe for connecting the decontamination water tank through a connection valve from a main steam pipe which connects a steam generator and a turbine, wherein the connection valve is configured by a three-way valve, is located upstream or downstream from the main steam safety valve, and is configured to discharge the generated steam to the air when an accident occurs within a design basis and to transfer the generated steam to the decontamination water tank when a severe accident occurs.

According to still another aspect of the present invention, there is provided a nuclear power plant main steam system, which reduces the atmospheric discharge of radioactive materials generated in an accident, the system including: a decontamination water tank containing decontamination water; and a connection pipe for connecting the decontamination water tank through a connection valve from a main steam pipe which connects a steam generator and a turbine, wherein the connection valve is configured by a three-way valve, is located upstream or downstream from an atmospheric dump valve, and is configured to discharge the generated steam to the air when an accident occurs within a design basis and to transfer the generated steam to the decontamination water tank when a severe accident occurs.

According to yet another aspect of the present invention, there is provided a nuclear power plant main steam system, which reduces the atmospheric discharge of radioactive materials generated in an accident, the system including: a decontamination water tank containing decontamination water; and a connection pipe for connecting the decontamination water tank through two or more connection valves from a main steam pipe which connects a steam generator and a turbine, wherein the connection valves are configured by three-way valves, are located at two or more positions, including positions located upstream or downstream from the main steam safety valve and upstream or downstream from an atmospheric dump valve, and are configured to discharge the generated steam to the air when an accident occurs within a design basis and to transfer the generated steam to the decontamination water tank when a severe accident occurs, by using the connection valves.

According to yet still another aspect of the present invention, there is provided a nuclear power plant main steam system, which reduces the atmospheric discharge of radioactive materials generated in an accident, the system including a connection pipe for connecting a containment building or containment filtered venting system (CFVS) through a main steam safety valve or a connection valve from a main steam pipe which connects a steam generator 13 and a turbine, wherein: when connected to the man steam safety valve, the main steam safety valve is configured by a three-way valve and is configured to discharges generated steam to the air when an accident occurs within a design basis, and to transfer the steam to the containment building or the exhaust filter device when a severe accident occurs; and when connected to the connection valve, the connection valve is configured by a three-way valve, is located upstream or downstream from the main steam safety valve, or upstream or downstream from an atmospheric dump valve, and is configured to discharge the generated steam to the air when an accident occurs within a design basis and to transfer the generated steam to the containment building or the exhaust filter device when a severe accident occurs.

According to a further still another aspect of the present invention, there is provided a method for reducing atmospheric discharge of radioactive materials in an accident, the method including: transferring, to a decontamination water tank containing decontamination water, a gas mixture containing radioactive materials discharged from inside a steam generator when a severe accident occurs in a nuclear power plant, through a connection pipe connected to a main steam pipe (step 1); decontaminating the gas mixture transferred to the decontamination water tank in step 1 (step 2); and discharging the gas mixture decontaminated in step 2 through a discharge port of the decontamination water tank (step 3).

As described above, a main steam system according to the present invention has an effect of reducing discharge of radioactive materials to the air when a containment bypass accident including a steam generator tube rupture caused by high-temperature steam occurs.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic view illustrating an example of a primary system and a main steam system in a conventional nuclear power plant; and FIGS. 2 to 9 are schematic views illustrating an example of a main steam system according to the present invention.

DESCRIPTION OF THE PREFERRED EMBODIMENTS

According to one aspect of the present invention, there is provide a nuclear power plant main steam system 100, which reduces the atmospheric discharge of radioactive materials generated in an accident, the system including:

a decontamination water tank 130 containing decontamination water 131; and a connection pipe 120 for connecting the decontamination water tank 130 from a main steam pipe 110 which connects a steam generator 13 and a turbine, wherein the connection pipe 120 is connected to the decontamination water tank 130 through a main steam safety valve 121 or a connection valve 113, wherein the main steam safety valve 121 or the connection valve 113 is configured by a three-way valve so as to discharge the generated steam when an accident occurs within a design basis (DBA), and to transfer the generated steam to the decontamination water tank 130.

According to one aspect of the present invention, as illustrated in FIG. 2, there is provide a nuclear power plant main steam system 100, which reduces tube atmospheric discharge of radioactive materials generated in an accident, the system including:

a decontamination water tank 130 containing decontamination water 131; and a connection pipe 120 for connecting the decontamination water tank 130 through a main steam safety valve 121 from a main steam pipe 110 which connects a steam generator 13 and a turbine, wherein the main steam safety valve 121 is configured by a three-way valve so as to discharge the generated steam when an accident occurs within a design basis (DBA), and to transfer the generated steam to the decontamination water tank 130.

In addition, according to another aspect of the present invention, as illustrated in FIG. 3 or FIG. 4, there provided a nuclear power plant main steam system 100, which reduces the atmospheric discharge of radioactive materials generated in an accident, the system including:

a decontamination water tank 130 containing decontamination water 131; and a connection pipe 120 for connecting the decontamination water tank 130 through a connection valve 113 from a main steam pipe 110 which connects a steam generator 13 and a turbine, wherein the connection valve 113 is configured by a three-way valve and is located upstream or downstream from the main steam safety valve 121, and is configured to discharge the generated steam when an accident occurs within a design basis (DBA) and to transfer the generated steam to the decontamination water tank 130.

In addition, according to still another aspect of the present invention, as illustrated in FIG. 5 or FIG. 6, there is provided a nuclear power plant main steam system 100, which reduces the atmospheric discharge of radioactive materials generated in an accident, the system including: a decontamination water tank 130 containing decontamination water 131; and a connection pipe 120 for connecting the decontamination water tank 130 through a connection valve 113 from a main steam pipe 110 which connects a steam generator 13 and a turbine, wherein the connection valve 113 is configured by a three-way valve and is located upstream or downstream from the atmospheric dump valve 111, and is configured to discharge the generated steam to the air and to transfer the generated steam to the decontamination water tank 130.

In addition, according to yet still another aspect of the present invention, as illustrated in FIG. 8, there is provided a nuclear power plant main steam system 100, which reduces the atmospheric discharge of radioactive materials generated in an accident, the system including:

a decontamination water tank 130 containing decontamination water 131; and a connection pipe 120 for connecting the decontamination water tank 130 through two or more connection valves 113 from a main steam pipe 110 which connects a steam generator 13 and a turbine, wherein the connection valve 113 is configured by a three-way valve and is located at two or more positions, that is, upstream and downstream from the main steam safety valve 121, and upstream and downstream from the atmospheric dump valve 111, and is configured to discharge the generated steam to the air when an accident occurs within a design basis and to transfer the generated steam to the decontamination water tank 130 in a severe accident.

At this point, an example of a conventional main steam system 20 is illustrated in the schematic view of FIG. 1, and an example of the main steam system according to the present invention is illustrated through the schematic views of FIGS. 2 to 9.

Hereinafter referring to the schematic views of FIGS. 1 to 9, the main steam system 100 according to the present invention will be described in detail.

As illustrated in FIG. 1, a main steam system 20 of a conventional nuclear power plant refers to series of structures which perform the function of transporting the steam generated in a steam generator 13 located inside a containment building 11 of a primary system 10. The main steam system is configured from: a main stem pipe 30, an atmospheric dump valve 31 (ADV), a main steam safety valve 32 (MSSV), a main steam isolation valve 33 (MSIV), a turbine bypass valve, a main steam common header, etc.

The steam supplied through one or two steam nozzles connected to each steam generator is collected to one main steam common header in a turbine building via each of the valves (ADV, MSSV, and MSIV) and is transferred to a high-pressure turbine. The turbine bypass pipe is connected to the main steam common header, and at the time of abrupt turbine stop or abrupt output cutback, excessive steam can be directly transferred to a condenser or to the air and are divided into a total of about 8 pipes. The turbine bypass valves are respectively mounted on the pipes.

Four to five main steam safety valves 32 may be installed for each steam pipe so that an excessive pressure in the main steam system can be prevented. The total discharge capabilities of ail valves are designed sufficiently large so as to correspond to the flow rate, at the time of full output operation. The main steam isolation valve 33 functions to isolate the steam generator 13 in order to prevent excessive cooling of a reactor cooling system due to a steam discharge when the main steam pipe 30 is damaged. The atmospheric dump valve 31 is configured to directly discharge excessive steam to the air, when the steam generator is isolated or the function of the condenser is lost simultaneously with turbine stop, and to cool the reactor cooling system. The main steam safety valve is a spring-driven valve and is automatically opened sequentially when the steam pressure reaches a set value. The atmospheric dump valve may be manually operated from a main control room or a remote stop panel.

As such, in the conventional art, when an accident such as severe accident-caused rupture of the steam generator tube 14 occurs, a situation may be caused in which the main steam isolation valve is closed and the main steam safety valve is stuck open. In such a situation in which the main steam safety valve is stuck open, radioactive materials in a primary cooling material is directly discharged to the air.

In this case, as illustrated in the schematic views of FIGS. 2 to 8, the present invention provides a main steam system 100 including: decontamination water tank 130 containing decontamination water 131; and a connection pipe 120 for connecting the decontamination water tank from a main steam pipe 110 for connecting a steam generator and a turbine through a main steam safety valve 121 or a connection valve 113.

The main steam safety valve 121 or the connection valve 113 is configured by a three-way valve, and is configured to discharge the generated steam to the air when an accident occurs within a design basis, and to transfer the steam to the decontamination water tank 130 in a severe accident, and thus may reduce the atmospheric discharge of radioactive materials.

For example, as illustrated in FIG. 2, the connection pipe 120 may be connected to the decontamination water tank 130 through the main steam safety valve 121 composed of a three-way valve, and as illustrated in FIG. 3 to FIG. 6, the connection pipe may be connected to the decontamination water tank through the connection valve 113 composed of a three-way valve.

At this time, as illustrated in FIG. 3, the connection valve 113 may be located upstream from the main steam safety valve 121, and as illustrated in FIG. 4, the connection valve may be located downstream from the main steam safety valve.

In addition, as illustrated in FIG. 5, the connection valve 113 may be located upstream from the atmospheric dump valve 111, and as illustrated in FIG. 6, the connection valve may be located downstream from the atmospheric dump valve.

In one specific example, the severe accident may be a containment bypass accident such as a steam generator tube rupture (SGTR) or an intersystem loss of coolant accident (ISLOCA).

In another example, the connection pipe 120 includes a nozzle 122 on an end portion connected to the decontamination water tank 130. The nozzle is preferably disposed on a lower end portion of the decontamination water tank, and more specifically, is preferably immersed into the decontamination water 131 located inside the decontamination water tank. In an example, as illustrated in the schematic view of FIG. 2, the end portion of the connection pipe 120 may be immersed into the decontamination water, and as illustrated in the schematic view of FIG. 7, and the connection pipe may be connected to the lower end portion of the decontamination water tank.

The decontamination water tank 130 preferably includes a discharge port 132 which is connected to the upper end portion of the decontamination water tank and through which the steam which is not dissolved into the decontamination water 131 is discharged to the outside.

At this point, the steam which is not dissolved into the decontamination water 131 may possibly contain a portion of radioactive materials. Thus, preferably, the radioactive materials may not be directly discharged to the air through the discharge port 132, but discharged to an in-containment refueling water storage tank 15 (IRWST) located inside a containment building 11 or to an exhaust filter device 160 located outside.

In a specific example, the main steam system 100 may include a first discharge pipe 140 which connects the containment building 11 and the discharge port 132 of the decontamination water tank 130. The steam firstly subjected to decontamination through a main steam system according to the present invention is re-injected into the containment building, and thus, the discharge of radioactive materials to the air may further be suppressed. In particular, an effect of decontaminating radioactive materials once again by connecting the first discharge pipe to the in-containment refueling water storage tank 15 may be achieved.

The first discharge pipe 140 may include the containment building 11, in particular, a check valve for preventing a back flow of fluid from the in-containment refueling water storage tank 15 to the decontamination water tank 130.

In another example, the main steam system 100 may include a second discharge pipe 150 which connects the exhaust filter device 160 and the discharge port 132 of the decontamination water tank 130. By discharging the steam through the exhaust filter device installed outside the primary system, an increase in the internal pressure of the containment building 11 may be prevented, and an additional decontamination effect may be expected.

Furthermore, the main steam system 100 according to the present invention may include a cooling tank 133 which surrounds the outside of the decontamination water tank 130 and cools the decontamination water tank.

For example, as illustrated in FIG. 7 and FIG. 8, the decontamination water tank 130 included in the main steam system 100 proposed by the present invention preferably includes a cooling tank 133 capable of external cooling. If the inner pressure of the decontamination water tank 130 is increased, steam is not sufficiently condensed and a dynamic load may be caused, and danger of the damage of the decontamination water tank may be caused. To prevent this, the pressure and temperature inside the decontamination water tank may preferably be decreased, and the pressure and temperature inside the decontamination water tank may be decreased through the cooling tank proposed by the present invention. In addition, when the discharge port 132 or the decontamination water tank 130 is connected to the exhaust filter device 160, since the design pressure of the exhaust filter device is approximately 10 atm, the pressure inside the decontamination water tank is preferably decreased to at most 5-10 atm.

The cooling tank 133 may be installed outside the decontamination water tank 130 and have a water tank-like shape. In addition, external cooling performance may be enhanced by installing cooling fins on the cooling tank, and the cooling tank may be filled with fire-fighting water.

On the other hand, as illustrated in FIG. 8, wherein the connection valve 113 are located at two or more positions, including positions located upstream or downstream from the main steam safety valve 121 and upstream or downstream from an atmospheric dump valve 111, and are configured to discharge the generated steam to the air when an accident occurs within a design basis and to transfer the generated steam to the decontamination water tank when a severe accident occurs, by using the connection valves.

In addition, according to another aspect of the present invention, there is provided a nuclear power plant main steam system 100, which reduces the atmospheric discharge of radioactive materials generated in an accident, the system including a connection pipe 120 for connecting a containment building 11 and an exhaust filter device 160 through a main steam safety valve 121 or a connection valve 113 from a main steam pipe 100 which connects a steam generator 13 and a turbine, wherein: when connected to the man steam safety valve 121, the main steam safety valve is configured by a three-way valve, and is configured to discharge generated steam to the when an accident occurs within a design basis, and to transfer the steam to the containment building 11 or the exhaust filter device 160 when a severe accident occurs; and when connected with the connection valve 113, the connection valve configured by a three-way valve, located upstream or downstream from the main steam safety valve 121, or upstream or downstream from an atmospheric dump valve 111, and is configured to discharge the generated steam to the air when an accident occurs within a design basis and to transfer the generated steam to the containment building 11 or the exhaust filter device 160 when a severe accident occurs.

For example, as illustrated in FIG. 9, When a containment bypass accident including a steam generator tube rupture caused by high-temperature steam occurs, the steam including radioactive materials is, through main steam safety valve 121 or connection valve 113 of the main steam system 100, transferred to the containment building 11, particularly, to the in-containment refueling water storage tank 15 located inside the containment building 11 or transferred to the exhaust filter device 160, and thus, the atmospheric discharge of the radioactive materials may be reduced.

In addition, the present invention provides a method for reducing atmospheric discharge of radioactive materials in an accident, the method including:

transferring, to a decontamination water tank containing decontamination water, a gas mixture containing radioactive materials discharged from inside a steam generator when a severe accident occurs in a nuclear power plant, through a connection pipe connected through a main steam safety valve or a connection valve connected to a main steam pipe (step 1);

decontaminating the gas mixture transferred to the decontamination water tank in step 1 (step 2);

and discharging the gas mixture decontaminated in step 2 through a discharge port of the decontamination water tank (step 3).

Hereinafter each step of a method for reducing atmospheric discharge of radioactive materials in an accident will be described in detail.

Firstly, in the method for reducing atmospheric discharge of radioactive materials in an accident, step 1 is a step in which when a severe accident occurs in a nuclear power plant, a gas mixture containing radioactive materials discharged from inside a steam generator is transferred, through a connection pipe connected to a main steam pipe, to a decontamination water tank containing decontamination water.

In step 1, when a severe accident occurs in a nuclear power plant, a gas mixture containing radioactive materials discharged from inside a steam generator is to be treated, and to this end, the gas mixture is transferred to the decontamination water tank through the connection pipe connected to the main steam pipe.

Specifically, the method for reducing atmospheric discharge of radioactive materials in an accident may be performed in the main steam system 100 as described above.

The main steam system proposed by the present invention includes a connection pipe 120 connected to a main steam pipe 110, and the main steam pipe and the connection pipe may be connected through a main steam safety valve 121 or a connection valve 113.

The main steam safety valve 121 or the connection valve 113 may be configured by three-way valves, and thus, a radioactive material-containing gas mixture, which may cause a problem when a severe accident occurs, may be transferred to a decontamination water tank 130.

In addition, the severe accident in step 1 may be a containment bypass accident such as a steam generator tube rupture (SGTR) or an intersystem loss of coolant accident (ISLOCA).

Subsequently, in the method for reducing atmospheric discharge of radioactive materials in an accident according to the present invention, step 2 is a step for decontaminating the gas mixture transferred to the decontamination water tank in step 1.

In step 2, the gas transferred to the decontamination water tank is decontaminated.

In a specific example, the decontamination in step 2 may include a condensation treatment of steam in the gas mixture, a decontamination treatment of radioactive materials, and a hydrogen removal treatment. In step 1, steam in the transferred gas mixture is condensed, nuclear fission products are removed, and hydrogen is removed, thereby lowering explosion probability.

In addition, after performing step 2, a step for cooling the decontaminated gas mixture and adjusting a pressure may further be provided. The cooling and adjusting of pressure may be performed by using a cooling tank which surrounds the outside of the decontamination water tank for cooling the decontamination water tank.

When the inner pressure of the decontamination water tank 130 is increased, steam is not sufficiently condensed and a dynamic load may be caused, and thus, danger of the damage of the decontamination water tank may be caused. To prevent this, after performing step 2, it is desirable to decrease the pressure and temperature inside the decontamination water tank, and the pressure and temperature inside the decontamination water tank may be decreased by external cooling through the cooling tank.

Subsequently, in the method for reducing atmospheric discharge of radioactive materials in an accident according to the present invention, step 3 is a step for discharging the gas mixture decontaminated in step 2 through a discharge port of the decontamination water tank.

In step 3, the gas mixture decontaminated by passing through the decontamination water tank is discharged through the discharge port.

In a specific example, the discharging in step 3 may be performed by discharging the gas mixture to an in-containment refueling water storage tank (IRWST) located inside a containment building.

In another example, the discharging in step 3 may be performed by discharging the gas mixture to an exhaust filter device.

Although specific examples for a main steam system and a method for reducing atmospheric discharge of radioactive materials in an accident have been described, it is obvious to those skilled in the art that aside from the apparatus and method described above, the present invention may be embodied in another specific form without departing from the spirit and scope thereof. Therefore, embodiments described above should not be construed as limitative but illustrative, and thus, the present invention is not limited to the above description, and may also be modified within the scope of claims and equivalent scope thereto.

What is claimed is:

1. A nuclear power plant main steam system, which reduces the atmospheric discharge of radioactive materials generated in an accident, the system comprising:
   a decontamination water tank containing decontamination water;
   a connection pipe for connecting the decontamination water tank to a main steam pipe which connects a steam generator and a turbine;
   a main steam safety valve located upstream from the decontamination water tank; and
   an atmospheric dump valve,
   wherein the atmospheric dump valve is located upstream from the main steam safety valve,
   wherein the atmospheric dump valve is configured to discharge generated steam to atmosphere when an accident occurs within a design basis;
   wherein the main steam safety valve comprises a three-way valve configured to transfer the generated steam toward the turbine, to close to prevent transfer of the generated steam therethrough when an accident occurs within a design basis, and to transfer the generated steam to the decontamination water tank when a containment bypass accident occurs.

2. The nuclear power plant main steam system as set forth in claim 1, wherein the containment bypass accident comprises a steam generator tube rupture (SGTR) or an intersystem loss of coolant accident (ISLOCA).

3. The nuclear power plant main steam system as set forth in claim 1, wherein the connection pipe is connected to the decontamination water tank, and an end portion of the connection pipe comprises a nozzle.

4. The nuclear power plant main steam system as set forth in claim 3, wherein the nozzle is disposed on a lower end portion of the decontamination water tank.

5. The nuclear power plant main steam system as set forth in claim 1, wherein the decontamination water tank comprises a discharge port which is connected to an upper end portion thereof for discharging steam which is not dissolved into the decontamination water.

6. The nuclear power plant main steam system as set forth in claim 5, wherein the main steam system comprises a first discharge pipe located downstream from the water decontamination tank, the first discharge pipe being configured to connect the discharge port of the decontamination water tank to a containment building.

7. The nuclear power plant main steam system as set forth in claim 5, wherein the main steam system further comprises an exhaust filter device, and comprising a discharge pipe connecting the discharge port of the decontamination water tank to the exhaust filter device.

8. The nuclear power plant main steam system as set forth in claim 1, wherein the main steam system comprises a cooling tank configured to surround an outside of the decontamination water tank and cool the decontamination water tank.

9. A nuclear power plant main steam system, which reduces the atmospheric discharge of radioactive materials generated in an accident, the system comprising:
   a decontamination water tank containing decontamination water;
   a connection pipe for connecting the decontamination water tank to a main steam pipe which connects a steam generator and a turbine;
   a main steam safety valve; and
   a connection valve;
   wherein the main steam safety valve and the connection valve are both located upstream from the decontamination water tank,
   wherein the connection valve is located downstream from the main steam safety valve,
   wherein the connection valve comprises a three-way valve configured to transfer generated steam to atmosphere when an accident occurs within a design basis, and to transfer the generated steam to the decontamination water tank when a containment bypass accident occurs.

10. A nuclear power plant main steam system as set forth in claim 9, further comprising an atmospheric dump valve located upstream from the connection valve.

11. The nuclear power plant main steam system as set forth in claim 9, wherein the containment bypass accident comprises a steam generator tube rupture (SGTR) or an intersystem loss of coolant accident (ISLOCA).

12. The nuclear power plant main steam system as set forth in claim 9, wherein the connection pipe is connected to the decontamination water tank, and an end portion of the connection pipe comprises a nozzle.

13. The nuclear power plant main steam system as set forth in claim 12, wherein the nozzle is disposed on a lower end portion of the decontamination water tank.

14. The nuclear power plant main steam system as set forth in claim 9, wherein the decontamination water tank comprises a discharge port which is connected to an upper end portion thereof for discharging steam which is not dissolved into the decontamination water.

15. The nuclear power plant main steam system as set forth in claim 14, wherein the main steam system comprises a first discharge pipe located downstream from the decontamination water tank, the first discharge pipe being configured to connect the discharge port of the decontamination water tank to a containment building.

16. The nuclear power plant main steam system as set forth in claim 14, wherein the main steam system further comprises an exhaust filter device, and comprising a discharge pipe connecting the discharge port of the decontamination water tank to the exhaust filter device.

17. The nuclear power plant main steam system as set forth in claim 9, wherein the main steam system comprises a cooling tank configured to surround an outside of the decontamination water tank and cool the decontamination water tank.

* * * * *